United States Patent Office 3,117,981
Patented Jan. 14, 1964

3,117,981
PROCESS FOR PREPARING 3-OXO-SPIRO-(CYCLOALKANE-1',2-COUMARANS)
Gerhard Korger, Georg Nesemann, and Johann König, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 11, 1961, Ser. No. 102,125
Claims priority, application Germany Apr. 14, 1960
6 Claims. (Cl. 260—346.2)

The present invention relates to novel 3-oxo-spiro-(cycloalkane-1',2-coumarans) of the Formula I

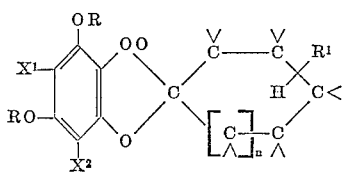

in which $n$ represents the integers 0 or 1, R represents an alkyl group containing up to 5 carbon atoms, $R^1$ stands for an alkyl or alkoxy group containing 1 to 8 carbon atoms and $X^1$ and $X^2$ which may be identical or different, represent hydrogen or halogen atoms and to galenical preparations containing said compounds as the active ingredient.

The products of the present invention are pharmacodynamically, in particular antimycotically active and, moreover, constitute valuable intermediate products for the preparation of medicaments.

The present invention likewise relates to the preparation of said novel 3-oxo-spiro-(cycloalkane-1',2-coumarans) of the Formula I by reacting a phenol of the Formula II

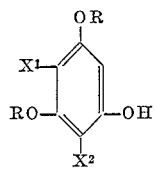

in which R, $X^1$ and $X^2$ have the meanings given above, with a 1-trichloromethyl-cycloalkane-1-ol of the Formula III

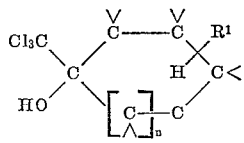

in which $n$ and $R^1$ have the meanings given above, in the presence of alkaline agents and treating the 1-aryloxy-cycloalkane-1-carboxylic acids thus obtained and corresponding to the Formula IV

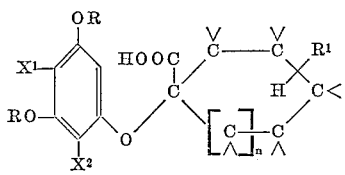

in which $n$, R, $R^1$, $X^1$ and $X^2$ have the meanings given above, with polyphosphoric acid or boron fluoride or boron fluoride complex compounds or reacting the carboxylic acids of the Formula IV in the form of their acid chlorides or acid bromides with boron fluoride or boron fluoride complex compounds.

The reaction is performed, for example, in the sense of the following scheme of formulae

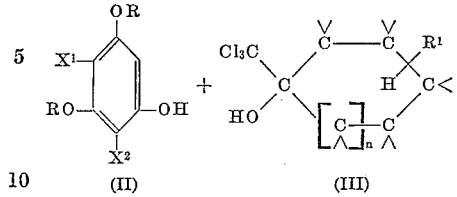
(II)        (III)

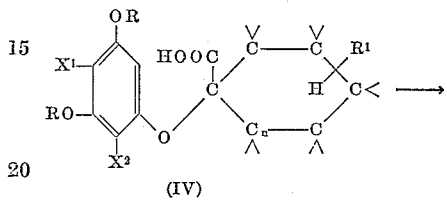
(IV)

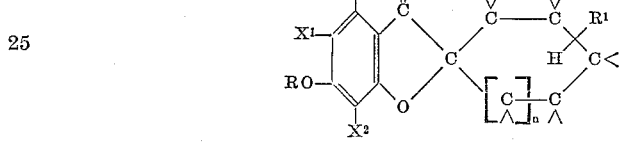
(I)

As alkyl groups $R^1$ there may be used, for instance, methyl, ethyl, n-propyl, isopropyl, n-butyl, isobutyl, tert. butyl, amyl, isoamyl, hexyl, heptyl and octyl groups.

As alkoxy groups $R^1$ there are preferably suitable straight-chain radicals such as methoxy, ethoxy, n-propoxy, n-butoxy, n-amyloxy, n-hexyloxy, n-heptyloxy and n-octyloxy groups.

The substituents $X^1$ and $X^2$ may be identical or different and may represent, for instance, hydrogen or halogen atoms. As halogen atoms there are preferably used chlorine or bromine atoms.

It was hitherto not known that aryloxy-acetic acids could be converted into 3-oxo-coumarans by means of polyphosphoric acid. Tests carried out by the applicants show that, for instance, coumaran-3-one is not formed in the reaction of phenoxyacetic acid with polyphosphoric acid. It was, therefore, not obvious that the ring closure reaction of the 1-aryloxy-cycloalkane-1-carboxylic acids corresponding to the formula IV would yield the 3-oxo-spiro-(cycloalkane-1'2-coumarans) of the Formula I when using polyphosphoric acid as a catalyst. It could even less be expected that the above-mentioned ring closure would be successful with the aid of boron fluoride since it was known that during the formation of such aromatic ketones carrying a methoxy group, in ortho-position to the entrance of the keto group, the methoxy group in ortho-position was already split off at low temperatures with the aid of boron fluoride as a catalyst. With splitting off the methyl group in the form of methyl fluoride there are simultaneously formed very stable inner complex $BF_2$ compounds [compare, for example, "Neuere Methoden der präparativen organischen Chemie," I, 3rd edition, Verlag Chemie G.m.b.H., Weinheim/Bergstrasse (1949), page 442].

In the first stage of the reaction phenols of the Formula II are reacted with 1-trichloromethyl-cycloalkane-1-ols of the Formula III in order to obtain 1-aryloxy-cycloalkane-1-carboxylic acids of the Formula IV. There are preferably used phenols of the Formula II in which the substituent R represents a low molecular alkyl radical, preferably a methyl or ethyl group. As results from the Formula II the phenols may carry as substituents in addition to the two alkoxy groups —OR likewise one or two identical or different halogen atoms, preferably chlorine or bromine atoms. There may be mentioned, for example: 3,5-dimethoxy-phenol, 3,5-diethoxy-phenol, 3,5-di-propoxy-phenol, 3,5-di-n-butoxy-phenol, 3,5-di-isobutoxy-phenol, 3,5-di-n-amyloxy-phenol, 3,5-di - isoamyloxy-phenol as well as correspondingly halogenated phenols such as 4-chloro - 3,5 - di - methoxy-phenol, 2-chloro-3,5-dimethoxy-phenol, 2-bromo-3,5-di - methoxy-phenol, 4-bromo-3,5-dimethoxy-phenol, 4-chloro-3,5 - diethoxy-phenol, 2-chloro-3,5 - diethoxy-phenol, 2 - bromo-3,5-diethoxy-phenol, 2-chloro-3,5 - di-propoxy-phenol, 2-chloro-3,5-di-n-butoxy-phenol, 2,4 - dichloro - 3,5 - dimethoxy-phenol, and the like.

As reaction components of these phenols of the Formula II there are mentioned, for example, the following 1-trichloromethyl-cycloalkane-1-ols: 1-trichloromethyl-cyclopentane-1-ol, 1-trichloromethyl-cyclohexane-1-ol, 1-trichloromethyl-alkylcyclohexane-1-ols such as 1 - trichloro-methyl-3-methyl-cyclohexane - 1 - ol, 1 - trichloromethyl-4-methyl-cyclohexane-1-ol, 1 - trichloro-methyl-4-ethyl-cyclohexane-1-ol, 1-trichloromethyl - 3 - ethylcyclohexane-1-ol, 1-trichloromethyl-4-propyl-cyclohexane-1-ol, 1-trichloromethyl-4-butyl-cyclohexane-1-ol, 1 - trichloromethyl-3-isobutyl-cyclohexane-1 - ol, 1 - trichloromethyl-tert.butyl-cyclohexane-1-ol, 1-trichloromethyl-4-isoamyl-cyclohexane-1-ol, 1-trichloromethyl - 4 - n-amyl-cyclohexane-1-ol; 1-trichloromethyl-4-hexyl-cyclohexane-1-ols, 1-trichloromethyl-4-heptyl-cyclohexane-1-ols, 1 - trichloromethyl-4-octyl-cyclohexane-1-ols such as 1-trichloromethyl-4-(1',1',3',3'-tetramethyl-butyl)-cyclohexane-1-ol; furthermore: 1-trichloromethyl-2-methoxy-cyclohexane-1-ol, 1-trichloromethyl-4-methoxy-cyclohexane-1-ol, 1-trichloromethyl-4-ethoxy-cyclohexane-1-ol, 1-trichloromethyl-4-propoxy-cyclohexane-1-ol, 1-trichloromethyl-4-butoxy-cyclohexane-1-ol, as well as other 1-trichloromethyl-2,3- or 4-alkoxy-cyclohexane-1-ols.

Apart from two representatives, the above mentioned 1-trichloromethyl-cycloalkane-1-ols of the Formula III represent novel compounds. They can be prepared by reacting the corresponding alkyl or alkoxy-cycloalkaneones with chloroform in the presence of alkaline agents, preferably pulverized potassium carbonate, while using an appropriate solvent or diluent, preferably formaldehyde-dimethyl-acetal, at temperatures between 0 and —30 ° C. The group $R^1$ may be present in 2-, 3- or 4-position of the cycloalkane ring. Alkyl and alkoxy groups of low molecular weight, particularly methyl, ethyl, methoxy and ethoxy groups are used with particular advantage, but the reaction succeeds, in principle, likewise if corresponding compounds substituted by alkyl or alkoxy groups of high molecular weight are used.

The reaction of a phenol of the Formula II with a 1-trichloromethyl-cycloalkane-1-ol is suitably carried out in the presence of at least 4 mols of alkali, preferably in the form of pulverized potassium carbonate, potassium-tert.-butylate or potassium-tert.-amylate and, advantageously, with the use of an appropriate solvent or diluent. As diluents there are particularly used secondary or tertiary alcohols of low molecular weight, especially isopropanol, tert.butanol and tert.amyl alcohol as well as mixtures of these alcohols. The reaction temperatures may vary between —20° C. and +80° C. It is useful to start the reaction at a low temperature, i.e. below 0° C., and to raise the temperature only later on to +20° C. to 40° C.

In the second stage of reaction of the process according to the invention the 1-aryloxy-cycloalkane-1-carboxylic acids of the Formula IV obtained by the reaction of a phenol of the Formula II with a 1-trichloromethyl-cycloalkane-1-ol of the Formula III are subjected to a ring closure reaction. As already mentioned, this ring closure reaction can be carried out with the aid of polyphosphoric acid as well as with boron fluoride.

The reaction conditions depend upon the type of the starting materials used and may vary within wide limits.

The ring closure with polyphosphoric acid generally requires moderately elevated temperatures, preferably between +40 and +90° C. The reaction is suitably carried out without solvents or diluents, since the concentration representing an optimum for a certain 1-aryloxy-cycloalkane-1-carboxylic acid may be adjusted most simply by varying the quantity of polyphosphoric acid used. The polyphosphoric acid is used in excess, preferably in 5 to 50 times the amount by weight, referred to the carboxylic acid used. The reaction period generally amounts to 10 to 60 minutes, but shorter or longer reaction periods likewise lead to the formation of the desired products.

When carrying out the ring closure by means of boron fluoride it is suitable simultaneously to use an inert solvent or diluent in order to insure a smooth course of the reaction. There are most advantageous solvents or diluents forming complex compounds with boron fluoride, especially dialkyl ethers such as diethyl ether and carboxylic acid alkyl esters, for instance ethyl acetate.

It is likewise possible to use the boron fluoride directly in the form of a boron fluoride-solvent complex, in which case the complex may simultaneously serve as solvent or diluent. The boron fluoride complex may, however, likewise be used in admixture with another diluent, for instance a benzene hydrocarbon such as benzene. A boron fluoride complex particularly appropriate for carrying out the ring closure reaction successfully, is the boron fluoride-diethyl etherate that may be used as such or in the presence of solvents or diluents such as carboxylic acid alkyl esters, for instance ethyl acetate, liquid hydrocarbons free from unsaturated compounds, such as benzene or toluene and the like.

The boron fluoride or the boron fluoride complex compounds are favorably used in excess. Generally, the ring closure requires moderately elevated temperatures, preferably such between +40 and +90° C. The reaction period generally amounts to 10 to 60 minutes, but shorter or longer reaction periods likewise lead to the formation of the desired products according to the invention.

The novel products of the invention are pharmacodynamically, in particular antimycotically active and, moreover, constitute valuable intermediate products for the preparation of medicaments.

In the following table are given the lowest effective concentrations having antimycotic action of 4,6-dimethoxy-3-oxospiro-(cyclohexane-1',2-coumaran) (test preparation No. I) and of 4,6-dimethoxy-4'-methyl-3-oxospiro-(cyclohexane-1',2-coumaran) (test preparation No. II) ascertained in the examination of various dermatophytes.

TABLE

| Dermatophytes | Test preparation No. I | | | Test preparation No. II | | |
| --- | --- | --- | --- | --- | --- | --- |
| | Lowest effective concentrations causing antimycotic action in micrograms/cc. (in solid culture media) | | | | | |
| | Without serum | With 20% of serum | Relative protein factor | Without serum | With 20% of serum | Relative protein factor |
| Microsporum gypseum | 62 | 62 | 1 | 31 | 62 | 2 |
| Microsporum canis | 62 | 62 | 1 | 31 | 62 | 2 |
| Trichophyton rubrum | 31 | 62 | 2 | 31 | 31 | 1 |
| Trichophyton tonsurans | 31 | 62 | 2 | 31 | 62 | 2 |
| Trichophyton mentagrophytes | 62 | 62 | 1 | 31 | 62 | 2 |
| Trichophyton epilans | 31 | 62 | 1 | 31 | 31 | 1 |

The test prepartions in the above-mentioned concentration when examined in solid culture media completely inhibited even after 3 days from the beginning of the tests the growth of the above-mentioned dermatophytes. The relative protein factor contained in the table represents a measure for the relative inactivation of the test preparations provoked by the addition of serum. The higher the protein factor, the more reduced is the efficiency of the antimycotics by the serum. The values contained in the table show that the test preprations in the presence of serum protein are nearly as active as without addition of serum and thus underline the favorable antimycotic properties of the products of the invention.

The novel 3-Oxo-spiro-(cycloalkane-1',2-coumarans) may be used as such or in the form of galenical preparations, for example, tablets, capsules, gelees, powders, ointments, pastes, mixtures that require shaking, tinctures, solutions or suspensions in admixture or conjunction with a pharmaceutical organic or inorganic carrier or diluent that does not react with the active ingredient. As carriers there may be mentioned, for example, water, gelatine, bolus, lactose, starch, magnesium stearate, talcum, vegetable oils, benzyl alcohol, gums, polyethylene-glycol, cholesterol, white petroleum jelly, zinc oxide, titanium dioxide or other carriers known for medicaments. The products of the invention or pharmaceutical preparations containing them may be sterilized and/or may contain assistants, such as stabilizers, buffers, wetting agents, emulsifyers or salts for regulating the osmotic pressure. The pharmaceutical preparations may be prepared according to usual methods.

The following examples serve to illustrate the invention but they are not intended to limit it thereto:

*Example 1*

4,6-DIMETHOXY-3-OXO-SPIRO-(CYCLO-HEXANE-1',2-COUMARAN)

(*a*) To a mixture of 500 cc. of tert.-butanol, 270 grams of pulverized caustic potash and 154 grams of 3,5-dimethoxy-phenol there is added dropwise while mechanically stirring within 150 minutes a solution of 220 grams of 1-trichloromethyl-cyclohexane-1-ol in 240 cc. of tert. butanol, so that the internal temperature amounts to 20–30° C. Stirring is continued for a further 3 hours and the solution is diluted by means of water. The reaction mixture is then neutralized by means of glacial acetic acid and the tertiary butanol is distilled off under reduced pressure. The residue is acidified by means of hydrochloric acid the separated oil is extracted with ether and the ether solution is shaken out several times with water. After evaporating the ether the residue is crystallized by means of petroleum ether. The crystals are subsequently recrystallized from a mixture of petroleum ether and chloroform and from methanol of 80% strength. The yield of 1-(3',5'-dimethoxyphenoxy)-cyclohexane-1-carboxylic acid amounts to 87 grams, the melting point to 112–114° C.

(*b*) 20 grams of 1-(3',5'-dimethoxy-phenoxy)-cyclohexane-1-carboxylic acid are mixed with 120 grams of polyphosphoric acid and heated for 30 minutes to 85–95° C. After cooling, the reaction mixture is decomposed by means of 150 cc. of ice water. An oily substance is at first precipitated which soon completely crystallizes. It is filtered off with suction, triturated several times with 2 N-sodium hydroxide solution, filtered off with suction, thoroughly washed with water and recrystallized from about 200 cc. of methanol of 80% strength (with addition of charcoal). There are obtained 13 grams (71% of the theoretical yield) of 4,6-dimethoxy-3-oxo-spiro-(cyclohexane-1',2-coumaran) melting at 146–148° C.

The 2,4-dinitrophenyl-hydrazone of the compound after recrystallization from dioxane/methanol melts at 250–251° C.

*Example 2*

4,6-DIETHOXY-3-OXO-SPIRO-(CYCLOHEXANE-1',2-COUMARAN)

(*a*) By reaction of 3,5-diethoxy-phenol with 1-trichloromethylcyclohexane-1-ol as described in Example 1 in the presence of pulverized caustic potash and isopropanol as a solvent there is obtained in a yield of 52% the 1-(3',5'-diethoxy-phenoxy)-cyclohexane-1-carboxylic acid.

Melting point: 124–126° C. (from aqueous methanol).

(*b*) From 5 grams of 1-(3',5'-diethoxy-phenoxy)-cyclohexane-1-carboxylic acid and 80 grams of polyphosphoric acid there is obtained according to the instructions given in Example 1 the 4,6-diethoxy-3-oxo-spiro-(cyclohexane-1',2-coumaran) showing a melting point of 128–130° C. (recrystallized from methanol of 70% strength).

*Example 3*

7-CHLORO-4,6-DIMETHOXY-3-OXO-SPIRO-(CYCLOHEXANE-1',2-COUMARAN)

(*a*) To a mixture of 52 grams of 2-chloro-3,5-dimethoxy-phenol, 73 grams of pulverized caustic potash and 150 cc. of isopropanol there is added dropwise within 1 hour, while mechanically stirring, a solution of 60 grams of 1-trichloromethyl-cyclohexane-1-ol in 80 cc. of isopropanol. The internal temperature is maintained at 20–25° C. by thoroughly cooling. After having additionally stirred for several hours, the reaction mixture is diluted with 300 cc. of water, neutralized with glacial acetic acid and the isopropanol is distilled off under reduced pressure. The residue is acidified and extracted with ether, the ether solution is washed with water and the ether is distilled off. The remaining residue is crystallized with a mixture of carbon tetrachloride and petroleum ether and then recrystallized twice from carbon tetrachloride. The yield of 1-(6'-chloro-3',5-dimethoxyphenoxy)-cyclohexane-1-carboxylic acid amounts to 26 grams, the melting point amounts to 155–157° C.

(*b*) 12.0 grams of 1-(3',5'-dimethoxy-6'-chlorophenoxy)-cyclohexane-1-carboxylic acid are mixed with 120 grams of polyphosphoric acid and heated to 85–90° C., while mechanically stirred for 1 hour. When the reaction is terminated, the mixture is decomposed by means of 190 cc. of ice water and the resulting crystalline mass is filtered off with suction. It is triturated with 240 cc. of 0.5 N-sodium hydroxide solution, the insoluble product is filtered off with suction, washed with hot water and recrystallized from methanol (with addition of charcoal). There are obtained 3.8 grams of 7-chloro-4,6-dimethoxy-3-oxo-spiro-(cyclohexane-1',2-coumaran). (33.6% of the theory, referred to the acid used). Melting point 179–181° C.

From the extract of sodium hydroxide solution there can be recovered by acidification with hydrochloric acid 4.4 grams of 1-(3',5'-dimethoxy-6'-chloro-phenoxy)-cyclohexane-1-carboxylic acid in a practically pure state. The yield of 7-chloro-4,6-dimethoxy-3-oxo-spiro-(cyclohexane-1',2-coumaran) amounts to 53.0% of the theory, referred to the reacted starting carboxylic acid. After repeated recrystallization from methanol the melting point of the spirane mentioned above amounts to 184–185° C.

The corresponding dinitrophenyl-hydrazone of the compound melts at 260–270° C. with decomposition.

*Example 4*

5-CHLORO-4,6-DIMETHOXY-3-OXO-SPIRO-(CYCLOHEXANE-1',2-COUMARAN)

10 grams of 1-(4'-chloro-3',5'-dimethoxy-phenoxy)-cyclohexane-1-carboxylic acid of a melting point of 134–136° C. (prepared by reaction of 4-chloro-3,5-dimethoxyphenol with 1-trichloromethylcyclohexane-1-ol in the presence of pulverized caustic potash and isopropanol corresponding to the instruction given in Example 3a) are mixed with 70 grams of polyphosphoric acid and heated for 40 minutes to 90° C. After cooling, the reaction mixture is decomposed by means of 100 cc. of ice water, the half-solid mass is taken up with ether, the ether solution is shaken out twice with dilute sodium hydroxide solution and, after drying over sodium sulfate the ether is distilled off. The remaining residue completely crystallizes on trituration with methanol. The crystalline mass is filtered off with suction, once recrystallized from aqueous methanol and subsequently from methanol.

There is thus obtained the product mentioned in the heading which melts at 101–102° C. The yield of the analytically pure product amounts to 2.7 grams (28.6% of the theory, referred to the 1 - (4' - chloro - 3',5' - dimethoxy-phenoxy)-cyclohexane-1-carboxylic acid).

The corresponding 2,4-dinitrophenyl-hydrazone of the compound melts at 205–206° C. (recrystallized from glacial acetic acid).

Example 5

4,6-DIMETHOXY-3-OXO-SPIRO-(CYCLOPENTANE-1',2-COUMARAN)

12 grams of 1-(3',5'-dimethoxy - phenoxy) - cyclopentane-1-carboxylic acid of a melting point of 85–87° C. (prepared by reaction of 3,5-dimethoxy-phenol with 1-trichloromethylcyclopentane-1-ol in the presence of pulverized potassium hydroxide and isopropanol corresponding to the instructions given in Example 3a) are heated for 30 minutes to 80–90° C. with 90 grams of polyphosphoric acid. After cooling, the reaction mixture is decomposed by means of ice water, and the precipitated half-solid mass is taken up with ether. The ether solution is shaken several times with dilute sodium hydroxide solution and, after drying, the ether is distilled off. The crystalline residue is recrystallized from aqueous methanol. The thus prepared 4,6-dimethoxy - 3 - oxo - spiro-(cyclopentane-1',2-coumaran) melts at 93–95° C.

The yield amounts to 9.8 grams (83% of the theory, referred to the acid used).

The 2,4-dinitrophenyl-hydrazone of the compound melts at 255–257° C. with decomposition (from dioxane/methanol).

Example 6

4,6-DIMETHOXY-4'-METHYL-3-OXO-SPIRO-(CYCLOHEXANE-1',2-COUMARAN)

A fine suspension is formed from 120 grams of polyphosphoric acid and 10 grams of 1-(3',5'-dimethoxy-phenoxy)-4-methyl-cyclohexane-1-carboxylic acid of a melting point of 137–139° C. (prepared by reaction of 3,5-dimethoxy-phenol with 4-methyl-1-trichloromethyl-cyclohexane-1-ol in the presence of pulverized caustic potash and isopropanol as solvent). The mixture that has formed is heated for 30 minutes to 85–95° C. while mechanically stirring. The clear, dark yellow mass is decomposed by means of ice water, the precipitated viscous mass is taken up with ether and the ether solution is shaken several times with dilute sodium hydroxide solution. After distilling off of the ether there remains a crystalline residue which is recrystallized from aqueous methanol. There are obtained 7 grams (74% of the theory) of the product mentioned in the heading, in the form of white crystals. After having recrystallized the product again from aqueous methanol, the yield amounts to 6.3 grams (67% of the theory).

The melting point amounts to 125–126° C.

The corresponding 2,4-dinitrophenyl-hydrazone of the compound melts at 242–247° C. with decomposition (recrystallized from dioxane/methanol).

Example 7

7-BROMO-4,6-DIMETHOXY-3-OXO-SPIRO-(CYCLOHEXANE-1',2-COUMARAN)

5.8 grams of most finely pulverized 1-(6'-bromo-3',5'-dimethoxy-phenoxy)-cyclohexane-1-carboxylic acid of a melting point of 156–157° C. (prepared according to the instructions given in Example 3a) by reaction of 2-bromo-3,5-dimethoxy-phenol with 1-trichloro-methyl-cyclohexane-1-ol in the presence of pulverized caustic potash and isopropanol) are intimately mixed with 30 grams of polyphosphoric acid and heated for 30 minutes to 80–90° C. After cooling, the reaction mixture is decomposed by means of ice water, the precipitated half-solid substance is taken up with ether and the ether solution is shaken several times with dilute sodium hydroxide solution in order to eliminate starting acid that has not reacted. After drying, the ether is distilled off and the remaining crystalline residue is recrystallized twice from methanol (with addition of charcoal). The thus obtained 7-bromo-4,6-dimethoxy-3-oxo-spiro-(cyclohexane-1',2-courmaran) melts at 186–188° C.

Example 8

4,6-DIMETHOXY-3-OXO-SPIRO-(CYCLOHEXANE-1',2-COUMARAN)

2 grams of 1-(3',5'-dimethoxy-phenoxy)-cyclohexane-1-carboxylic acid are heated with 10 cc. of boron fluoride-etherate for 1 hour on the steam bath and after drying, the forming clear solution is decomposed by the addition of ice. The crystalline precipitate is filtered off with suction, washed with water, triturated with sodium hydroxide solution and again filtered off with suction. After washing with water and drying on the steam bath there are obtained 1.65 grams of 4,6-dimethoxy-3-oxo-spiro-(cyclohexane-1',2-coumaran) (88.7% of the theory). After recrystallization from methanol the melting point remains unchanged. The product thus obtained is identical to the compound prepared according to the method using polyphosphoric acid as regards mixed melting point and IR-spectrum.

Example 9

4,6-DIETHOXY-3-OXO-SPIRO-(CYCLOHEXANE-1',2-COUMARAN)

2 grams of 1-(3',5'-diethoxy-phenoxy)-cyclohexane-1-carboxylic acid are heated on the steam bath with 10 cc. of boron fluoride etherate. After three minutes the total amount of acid is dissolved. After heating for 1 hour it is cooled, the reaction mixture is decomposed by means of ice, the crystalline precipitate is filtered off with suction, triturated at first with water and then with dilute sodium hydroxide solution, again filtered off with suction, washed with water and dried on the steam bath. The yield amounts to 1.85 grams (97.8% of the theory) of 4,6-diethoxy-3-oxo-spiro-(cyclohexane-1',2-coumaran) melting at 128.5 to 130° C. After recrystallization from methanol the melting point amounts to 129–131° C. The spirocyclic compound obtained is identical to the product obtained according to the method using polyphosphoric acid as regards the melting point, mixed melting point and the IR spectrum.

Example 10

7-CHLORO-4,6-DIMETHOXY-3-OXO-SPIRO-(CYCLOHEXANE-1',2-COUMARAN)

2 grams of 1-(3',5'-dimethoxy-6'-chloro-phenoxy)-cyclohexane-1-carboxylic acid are heated for 1 hour on the steam bath with 10 cc. of boron fluoride-etherate, and the clear reaction mixture is worked up as described in Examples 1 and 2. In this manner there is obtained 1.7 grams (91% of the theory) of 7-chloro-4,6-dimethoxy-3-oxo-spiro-(cyclohexane-1',2-coumaran) which melts at 184–187° C. After recrystallization from methanol the melting point amounts to 191–192° C. The product obtained is identical to the product obtained by the method using polyphosphoric acid as regards the IR spectrum.

Example 11

4,6-DIMETHOXY-3-OXO-SPIRO-(CYCLOHEXANE-1',2-COUMARAN)

7.5 grams of 1-(3',5'-dimethoxy-phenoxy)-cyclohexane-1-carboxylic acid are dissolved in 120 cc. of absolute ether, the solution is cooled to —20° C.; while stirring, 2.1 grams of pyridine and subsequently within 45 minutes a solution of 3.1 grams of thionyl-chloride in 25 cc. of absolute ether are dropwise added. The mixture is stirred for a further 30 minutes at —20° C. and subsequently for three and a half hours at room temperature. The pyridine-hydrochloride formed in the course of the reaction is separated off and the filtrate containing the 1-(3',5' - dimethoxy-phenoxy)-cyclohexane-1-carboxylic acid chloride is evaporated at a bath temperature of about 20° C. under reduced pressure. To the residue constituting a brownish oil there are added 40 cc. of boron fluoride etherate, and the forming clear solution is heated for 30 minutes on the steam bath. After terminated reaction, the reaction product is introduced into ice, the forming mixture is rendered alkaline by means of sodium hydroxide solution and the separated crystalline precipitate is filtered off with suction. The product obtained is triturated with sodium hydroxide solution, filtered off with suction, thoroughly washed with water and dried on the steam bath. There is thus obtained the 4,6 - dimethoxy - 3 - oxo - spiro - (cyclohexane - 1',2 - coumaran) in a yield of 5.6 grams (82% of the theory) and melting at 144–146° C. After recrystallization from methanol the yield amounts to 4.5 grams and the melting point to 145–147° C. The product obtained is identical to the compound obtained according to the method using polyphosphoric acid as regards melting point, mixed melting point and IR-spectrum.

*Example 12*

4,6-DIETHOXY-3-OXO-SPIRO-(CYCLO-HEXANE-1',2-COUMARAN)

2 grams of 1-(3',5'-diethoxy-phenoxy)-cyclohexane-1-carboxylic acid are boiled for 30 minutes on the steam bath with 5 cc. of ethyl acetate and 2 cc. of boron fluoride etherate. The clear solution that forms is evaporated under reduced pressure, water is added to the residue and the crystalline precipitate that has formed is filtered off with suction. The residue is triturated with sodium hydroxide solution, filtered off with suction, washed with water and dried on the steam bath. The yield amounts to 1.7 grams (89.9% of the theory), the melting point amounts to 125.5–128° C. After recrystallization from methanol of 80% strength the melting point amounts to 128.5–130.5° C. The product thus obtained corresponds in all physical properties to the product obtained by the method using polyphosphoric acid.

*Example 13*

4,6-DIETHOXY-3-OXO-SPIRO-(CYCLO-HEXANE-1',2-COUMARAN)

2 grams of 1-(3',5'-diethoxy-phenoxy)-cyclohexane-1-carboxylic acid are heated with 5 cc. of benzene and 2 cc. of boron fluoride etherate for 30 minutes on the steam bath. After eliminating the solvent by means of distillation under reduced pressure the remaining residue is worked up as described in Example 5. There are obtained 1.78 grams (94.1% of the theory) of 4,6-diethoxy-3-oxo-spiro-(cyclohexane-1',2-coumaran) having a melting point of 129–130.5° C. The product thus obtained corresponds to formerly prepared compounds as regards all physical properties.

*Example 14*

4,6-DIMETHOXY-3-OXO-SPIRO-(CYCLO-HEXANE-1',2-COUMARAN)

2.66 grams of 1-(3',5'-dimethoxy-phenoxy)cyclopentane-1-carboxylic acid are dissolved in a mixture of 3 cc. of ether and 8 cc. of benzene, a suspension is formed thereof and boron fluoride is introduced into the suspension with cooling, until it is saturated. The reaction mixture is then heated for 35 minutes on the steam bath, the solvent is distilled off under reduced pressure and the remaining residue is finely triturated by means of cold 2 N-sodium hydroxide solution. The resulting solid product is filtered off with suction, thoroughly washed with water and dried on the steam bath. The yield amounts to 2.15 grams (78% of the theory), the melting point amounts to 92–94° C.

After recrystallization from aqueous methanol the melting point amounts to 94–95° C. The product obtained is identical to the product obtained by the method using polyphosphoric acid as regards melting point, mixed melting point and IR spectrum.

*Example 15*

4,6-DIMETHOXY-4'-METHYL-3-OXO-SPIRO-(CYCLOHEXANE-1',2-COUMARAN)

2.94 grams of 1-(3',5'-dimethoxy-phenoxy)-4'-methyl-cyclohexane-1-carboxylic acid are made into a suspension with 15 cc. of ethyl acetate, and boron fluoride is introduced with cooling until the solution is saturated. The mixture is then boiled for 35 minutes on the steam bath, evaporated under reduced pressure and the remaining residue is finely triturated by means of cold 2 N-sodium hydroxide solution. The resulting solid product is filtered off with suction, washed several times with water and dried on the steam bath. The yield amounts to 2.35 grams (85% of the theory), the melting point amounts to 121–126° C. After recrystallization from aqueous methanol the yield amounts to 2.0 grams (72% of the theory), the melting point to 125–126° C. The product thus obtained is identical to the compound prepared by the method using polyphosphoric acid as regards all physical properties.

*Example 16*

4,6,4'-TRIMETHOXY-3-OXO-SPIRO-(CYCLO-HEXANE-1',2-COUMARAN)

(a) *1-(3',5'-dimethoxy-phenoxy) - 4 - methoxy-cyclohexane-1-carboxylic acid.*—25 grams of 3,5-dimethoxy-phenol are dissolved in 180 cc. of isopropanol or a suspension is made thereof and 45 grams of pulverized caustic potash are added while stirring at a temperature of +10° C. Within 35 minutes 41 grams of 4-methoxy-1-trichloromethyl-cyclohexane-1-ol are portionwise introduced so that the internal temperature does not exceed 40° C. After additional stirring for two hours 240 cc. of water and 10 cc. of glacial acetic acid are added to the reaction mixture and the isopropanol is distilled off under reduced pressure, if possible completely. The remaining mixture is acidified with hydrochloric acid and the precipitated oil is taken up with ether. The ether solution is shaken out several times with sodium bicarbonate solution and the alkaline extracts are acidified with hydrochloric acid. The precipitated oil is again taken up with ether and after drying the ether is distilled off. The 1-(3',5'-dimethoxy-phenoxy)-4-methoxy-cyclohexane-1-carboxylic acid spontaneously crystallizes completely. After recrystallization from benzene the melting point amounts to 149–151° C. The yield amounts to 18 grams.

If the mixture of 3,5-dimethoxy-phenol and 4-methoxy-1-trichloromethyl-cyclohexane-1-ol is mixed in the presence of tertiary amyl alcohol as solvent, a crystalline substance representing the above-mentioned acid is already obtained after acidification of the residue resulting after distilling off the tertiary amyl alcohol with hydrochloric acid.

(b) *4,6,4'-trimethoxy - 3 - oxo-spiro(cyclohexane-1',2-coumaran.*—13 grams of 1-(3',5'-dimethoxy-phenoxy)-4-methoxy-cyclohexane-1-carboxylic acid are finely pulverized and heated with 130 grams of polyphosphoric acid for 40 minutes to 85–95° C. After cooling, the reaction mixture is decomposed by means of ice and the half-solid mass that precipitates is dissolved in 50 cc. of boiling methanol after having been rinsed twice with water. To the methanol solution there are added 250 cc. of 0.5 N-sodium hydroxide solution and the mixture is cooled slowly. The separated crystals are filtered off with suction, washed with water and recrystallized from aqueous methanol. In this way there are obtained 9.8 grams of 4,6,4'-trimethoxy - 3 - oxo-spiro-(cyclohexane-1',2-coumaran) (80% of the theoretical yield) melting at 148–150° C. After recrytallization from benzene/petroleum ether and from methanol/water the melting point amounts to 149–150° C.

The 4-methoxy - 1 - trichloromethyl-cyclohexane-1-ol used as starting substance may be prepared as follows:

48 grams of pulverized caustic potash are introduced at −15 to −20° C. while stirring into a mixture of 240 cc. of formaldehyde-dimethylacetal and 130 cc. of chloroform and at the same temperature 90 grams of 4-methoxy-cyclohexane-1-one are added dropwise within 10 minutes. The mixture is again stirred for 2 hours at −15 to −20° C. and 660 cc. of water and 65 cc. of glacial acetic acid are then added. The lower layer containing the chloroform addition product is separated off, washed with water, dried and concentrated to a high degree by evaporation. The precipitated crystals are filtered off with suction, washed with carbon tetrachloride and dried. The yield amounts to 72 grams, the melting point to 145–150° C. After recrystallization from benzene the compound melts at 150–152° C.

*Example 17*

4,6,4'-TRIMETHOXY-3-OXO-SPIRO-(CYCLO-HEXANE-1',2-COUMARAN)

2.0 grams of 1-(3',5'-dimethoxy-phenoxy)-4-methoxy-cyclohexane-1-carboxylic acid and 10 cc. of boron fluoride-diethyldietherate are heated for 10 minutes on the steam bath. After cooling with ice water the clear solution is decomposed. The precipitated oil is taken up with ether, the ether solution is washed twice with 2 N-sodium hydroxide solution and twice with water, and the ether is distilled off. The remaining residue completely crystallizes and constitutes the 4,6,4'-trimethoxy-3-oxo-spiro-(cyclohexane-1',2-coumaran). The yield amounts to 1.8 grams (95% of the theory). After recrystallization from methanol of 80% strength the melting point amounts to 148–150° C. and the yield to 1.4 grams. The product thus prepared corresponds in all physical properties to the compound obtained according to the method using polyphosphoric acid.

*Example 18*

4,6,2'-TRIMETHOXY-3-OXO-SPIRO-(CYCLO-HEXANE-1',2-COUMARAN)

(a) *1 - (3',5' - dimethoxy - phenoxy)-2-methoxy-cyclohexane-1-carboxylic acid.*—25 grams of 3,5-dimethoxy-phenol are dissolved in 270 cc. of tert.butanol, the solution is cooled to −20° C. and, while stirring, 11.2 grams of pulverized caustic potash are added; subsequently 40 grams of 2-methoxy-1-trichloromethyl-cyclohexane-1-ol are added portionwise within 15 minutes. The mixture is still stirred for 1 hour at about −15° C. and 28.8 grams of pulverized caustic potash are than added in five portions and at intervals of about 15 minutes. The mixture is stirred for two hours at −15 to −10° C. and subsequently for a further five hours at 0 to +20° C. A small amount of ice and 30 cc. of glacial acetic acid are added to the reaction mixture and the tertiary amyl alcohol serving as solvent is distilled off under reduced pressure. The residue is acidified, the precipitated oil is taken up with ether and the ether solution is thoroughly shaken out with saturated sodium bicarbonate solution. The combined bicarbonate extracts are acidified, the precipitated oil is again taken up with ether, and the ether is distilled off after drying. The remaining residue consists of the desired 1 - (3',5' - dimethoxy-phenoxy)-2-methoxy-cyclohexane-1-carboxylic acid. The yield amounts to 17.5 grams.

(b) *4,6,2' - trimethoxy-3-oxo-spiro-(cyclohexane-1',2'-coumaran).*—16 grams of 1-(3',5'-dimethoxy-phenoxy)-2-methoxy-cyclohexane-1-carboxylic acid and 240 grams of polyphosphoric acid are heated for 45 minutes on the steam bath. The reaction mixture is decomposed with ice and completely extracted with ether. The ether solutions are shaken successively twice with dilute sodium hydroxide solution and twice with water and, after drying, the ether is eliminated by evaporation. The remaining residue (8.3 grams) is crystallized by trituration with ethyl acetate/petroleum ether. There are obtained 4.9 grams of 4,6,2'-trimethoxy-3-oxo-spiro-(cyclohexane-1',2-coumaran) of a melting point of 117–119° C. After recrystallization from methanol the melting point amounts to 118–119° C.

The 1 - (3',5' - dimethoxy - phenoxy)-2-methoxy-cyclohexane-1-carboxylic acid can likewise be converted into the 4,6,2'- trimethoxy-3-oxo-spiro-(cyclohexane-1',2-coumaran) by means of boron fluoride as described in Example 17.

The 2-methoxy-1-trichloromethyl-cyclohexane-1-ol used as starting substance may be prepared, for example, as follows: 320 cc. of formaldehyde-dimethylacetal, 175 cc. of chloroform and 63 grams of pulverized caustic potash are mixed with stirring at −15 to −20° C. and 120 grams of 2-methoxy-cyclohexane-1-one are then added dropwise within 25 minutes. The mixture is stirred for a further two hours at −15 to −20° C. and 800 cc. of water and 80 cc. of glacial acetic acid are then added. The lower layer constituting the chloroform addition product is separated off, washed twice with water and evaporated under reduced pressure. The remaining residue is distilled under reduced pressure and the fraction passing over at 130–158° C. under a pressure of 14 mm. of mercury is recrystallized from petroleum ether. There are obtained 40 grams of 2-methoxy-1-trichloromethyl-cyclohexane-1-ol showing a melting point of 59–61° C.

*Example 19*

7-CHLORO-4,6,2'-TRIMETHOXY-3-OXO-SPIRO-(CYCLOHEXANE-1',2-COUMARAN)

(a) *1-(3',5'-dimethoxy-6'-chlorophenoxy)-2-methoxy-cyclohexane-1-carboxylic acid.*—30.2 grams of 2-chloro-3,5-dimethoxy-phenol and 40 grams of 2-methoxy-1-trichloromethyl-cyclohexane-1-ol are reacted in the presence of totally 40 grams of pulverized potassium hydroxide and 275 cc. of tertiary amyl alcohol as solvent according to the directions given in Example 18a and worked up. There are obtained 7.0 grams of the desired acid which after recrystallization from acetic ester/petroleum ether melts at 126–128° C.

(b) *7 - chloro - 4,6,2' - trimethoxy-3-oxo-spiro-(cyclohexane-1',2-coumaran).*—3.5 grams of 1-(3'5'-dimethoxy-6' - chlorophenoxy)-2-methoxy-cyclohexane-1-carboxylic acid are finely pulverized and heated with 50 grams of polyphosphoric acid for 40 minutes on the steam bath. The reaction mixture is decomposed with ice and the separated resinous precipitate is taken up with ether. The ether solution is washed several times with dilute sodium hydroxide solution and with water and then evaporated. The crystalline residue [1.6 grams (48% of the theory)] melts at 189–191° C. after having been recrystallized twice from methanol.

*Example 20*

(a) *1 - (3',5'-dimethoxy-4'-chloro-phenoxy)-4-ethoxy-cyclohexane-1-carboxylic acid.*—26 grams of 4-ethoxy-1-trichloromethyl-cyclohexane-1-ol are reacted and worked up as described in Example 16a with 19 grams of 4-chloro-3,5-dimethoxyphenol in 90 cc. of tert.amyl alcohol and in the presence of, totally, 28 grams of pulverized caustic potash. There are thus obtained 13 grams of 1-(3',5',-dimethoxy - 4' - chlorophenoxy)-4-ethoxy-cyclohexane-1-carboxylic acid.

(b) *5 - chloro - 4,6 - dimethoxy-4'-ethoxy-3-oxo-spiro-(cyclohexane-1',2-coumaran).*—10 grams of 1-(3',5'-dimethoxy - 4'-chlorophenoxy)-4-ethoxycyclohexane-1-carboxylic acid are heated with 100 grams of polyphosphoric acid for 40 minutes on the steam bath, and, after cooling, the reaction mixture is decomposed by means of ice. The separated crystalline precipitate is filtered off with suction, triturated successively with water, dilute sodium hydroxide solution and again with water, and recrystallized from aqueous methanol. There are obtained 4.3 grams (45% of the theory) of the product showing a melting point of 156–158° C. After repeated recrystallization from methanol the yield amounts to 3.7 grams of the melting point to 158–159° C. The 4-ethoxy-1-trichloromethylcyclohexane-1-ol serving as starting substance is prepared as follows:

86 grams of 4-ethoxy-cyclohexane-1-one are reacted in a mixture of 115 cc. of chloroform and 360 cc. of formaldehyde-dimethyl-acetal with 85 grams of pulverized potassium hydroxide at a temperature of —15 to —20° C. as described in Example 1. After working up the substance there are obtained 37 grams of 4-ethoxy-1-trichloromethyl-cyclohexane-1-ol showing a melting point of 107–109° C.

Example 21

4,6-DIMETHOXY-4'-(1'',1'',3'',3''-TETRAMETHYL-BUTYL)-3-OXO-SPIRO-(CYCLOHEXANE-1',2-COUMARAN)

(a) *1-(1',1',3',3'-tetramethyl-butyl)-cyclohexane-1-carboxylic acid.*—To a mixture of 150 cc. of tert.-amyl alcohol, 20 grams of pulverized caustic potash and 14 grams of 3,5-dimethoxy-phenol there is added dropwise with mechanical stirring and cooling within 25 minutes a solution of 29 grams of 1-trichloromethyl-4-(1',1',3',3'-tetramethyl-butyl)-cyclohexane-1-ol in 120 cc. of tert.-amyl alcohol. After stirring for 4 hours at room temperature 250 cc. of water and 20 cc. of glacial acetic acid are added to the reaction mixture and the tert.-amyl alcohol is distilled off under reduced pressure. The residue is acidified with hydrochloric acid, the separated oil is extracted with dissopropyl ether and shaken several times with water. The carboxylic acid thus formed is then converted by repeated shaking with dilute ammonia in the form of the ammonium salt into the aqueous phase, whereas the neutral or weakly acid by-products remain in the ether phase. After clarification with charcoal the combined ammoniacal extracts are acidified with dilute sulfuric acid and the precipitated oil is extracted with ether. The ether solution is dried and the ether is distilled off. There are obtained 25 grams of 1-(3',5'-dimethoxyphenoxy)-4-(1',1',3',3'-tetramethyl-butyl)-cyclohexane-1-carboxylic acid in the form of a viscous oil.

(b) *4,6-dimethoxy-4'-(1'',1'',3'',3''-tetramethyl-butyl)-3-oxo-spiro-(cyclohexane-1',2-coumaran).*—22 grams of 1-(3',5'-dimethoxy-phenoxy)-4-(1',1',3',3'-tetramethyl-butyl)-cyclohexane-1-carboxylic acid are heated with 35 cc. of boron-fluoride etherate for 60 minutes on the steam bath. After cooling the reaction mixture is decomposed by addition of ice and sodium hydroxide solution and the precipitated oily product is taken up with isopropyl ether. When shaking the ether solution with dilute sodium hydroxide solution a part of the ring closure product that has formed already precipitates. It is filtered off with suction, the ethereal mother lye is evaporated and the residue is crystallized by inoculation with the already isolated product as well as by simultaneous trituration with isopropyl ether. The two crystallizates are combined, boiled out with methanol in order to separate dyeing impurities and the remaining product is recrystallized from methanol. The thus obtained 4,6-dimethoxy-4'-(1'',1'',3'',3''-tetramethyl-butyl)-3-oxo-spiro-(cyclohexane-1',2-coumarane) forms white crystals melting at 140–141° C. The pure yield amounts to 3.5 grams. The 1-trichloromethyl-4-(1',1',3',3'-tetramethyl-butyl)-cyclohexane-1-ol serving as starting substance for the preparation of the carboxylic acid described under (a) may be obtained in the following manner: Into a mixture of 150 cc. of methylal and 15 grams of pulverized potassium hydroxide cooled to —20° C. there are introduced at —15 to —20° C. while mechanically stirring, a mixture of 52 grams of 4-(1',1',3',3'-tetramethyl-butyl)-cyclohexane-1-one and 40 cc. of chloroform. The whole is stirred for a further 4 hours at —15° C. to —20° C. and 200 cc. of water and 20 cc. of glacial acetic acid are added to the reaction mixture. The organic layer is separated off, washed twice with water, dried, evaporated and the residue is fractionated. The desired chloroform addition product passes over at 130–155° C. under a pressure of 0.1 to 0.3 mm. of mercury. After recrystallization from a very small amount of petroleum ether the melting point of the 1-trichloromethyl-4-(1',1',3',3'-tetramethyl-butyl)-cyclohexane-1-ol amounts to 89–90° C. The 4-(1',1',3',3'-tetramethyl-butyl)-cyclohexane-1-one recovered as first running in the distillation may again be reacted with chloroform.

Example 22

4,6-DIMETHOXY-4'-ETHYL-3-OXO-SPIRO-(CYCLOHEXANE-1',2-COUMARAN)

(a) *1-(3',5'-dimethoxy-phenoxy)-4-ethyl-cyclohexane-1-carboxylic acid.*—142 grams of 1-trichloromethyl-4-ethyl-cyclohexane-1-ol are reacted and worked up as described in Example 21a with 89 grams of 3,5-dimethoxy-phenol in 450 cc. of tert.-amyl alcohol and in the presence of, totally, 155 grams of pulverized potassium hydroxide at 15–20° C. There are obtained in this manner 129 grams of 1-(3',5'-dimethoxy-phenoxy)-4-ethyl-cyclohexane-1-carboxylic acid.

(b) *4,6-dimethoxy-4'-ethyl-3-oxo-spiro-(cyclohexane-1',2-coumaran).* 50 grams of 1-(3',5'-dimethoxy-phenoxy-4'-ethyl-cyclohexanel-1-carboxylic acid are heated with 150 cc. of boron fluoride etherate for 45 minutes on the steam bath. After cooling, the reaction mixture is decomposed with ice and sodium hydroxide solution and the separated product is taken up in a large amount of ether. The ether solution is shaken several times with dilute sodium hydroxide solution and water and the ether is distilled off after drying. The remaining residue immediately crystallizes on trituration with methanol. The crystals are filtered off with suction and recrystallized from methanol. The thus obtained 4,6-dimethoxy-4'-ethyl-3-oxo-spiro-(cyclohexane-1',2-coumaran) melts at 140–142° C.

The 4-ethyl-1-trichloromethyl-cyclohexane-1-ol serving as starting substance may be prepared as follows:

170 grams of 4-ethyl-cyclohexane-1-one are introduced, while mechanically stirring, into a mixture cooled to —20° C. to —25° C. containing 400 cc. of methylal, 215 cc. of chloroform and 81 grams of pulverized potassium hydroxide. The mixture is stirred for a further 2 hours at —20° C. and worked up as described in Example 21. The substance is purified by distillation; the compound melts at 138–140° C. under a pressure of 13 mm. of mercury.

We claim:
1. A process for preparing 3-oxo-spiro-(cycloalkane-1',2-coumarans) of the formula

(I)
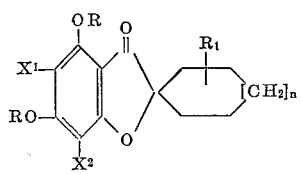

wherein *n* is an integer between 0 and 1 inclusive, R is alkyl having 1–5 carbon atoms, $R_1$ is a member selected from the group consisting of hydrogen and alkyl and alkoxy radicals having 1–8 carbon atoms, and $X^1$ and $X^2$ are members selected from the group consisting of hydrogen, chlorine, and bromine, which process comprises reacting a phenol of the formula (II)
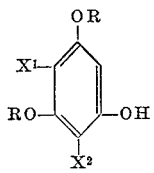

in the presence of potassium hydroxide and in a diluent selected from the group consisting of secondary and tertiary lower alkanols, with 1-trichloromethyl-cycloalkane-1-ols of the formula (III) 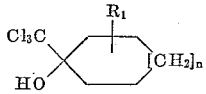

whereby 1-aryloxy-cycloalkane-1-carboxylic acids of the formula (IV) 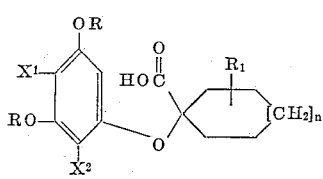

are formed, and then reacting said 1-aryloxy-cycloalkane-1-carboxylic acids with a member selected from the group consisting of polyphosphoric acid, boron fluoride, boron fluoride dialkyl etherates, and boron fluoride carboxylic acid alkyl esterates.

2. A process as in claim 1 wherein said 1-trichloromethylcycloalkane-1-ol is

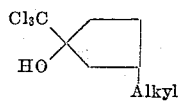

3. A process as in claim 1 wherein said 1-trichloromethylcycloalkane-1-ol is

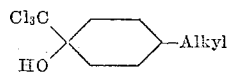

4. A process as in claim 1 wherein said 1-trichloromethyl-cycloalkane-1-ol is

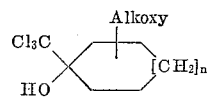

5. A process as in claim 1 wherein said 1-aryloxycycloalkane-1-carboxylic acids are reacted with boron fluoride diethyl etherate.

6. A process as in claim 1 wherein said 1-aryloxycycloalkane-1-carboxylic acids are reacted in the form of a member selected from the group consisting of 1-aryloxycycloalkane-1-carboxylic acid chlorides and 1-aryloxycycloalkane-1-carboxylic acid bromides.

References Cited in the file of this patent

Mulholland et al.: J. Chem. Soc., London (1952), page 3988.

Dawkins et al.: J. Chem. Soc., London (1959), page 1830.

MacMillan et al.: J. Chem. Soc., London (1957), page 3124.